(12) United States Patent
Busse et al.

(10) Patent No.: US 7,918,661 B2
(45) Date of Patent: Apr. 5, 2011

(54) CONTROLLER FOR A MACHINE WITH A NUMBER OF FUNCTIONS UNITS, IN PARTICULAR CONTROLLER FOR A BLOW-MOLDING MACHINE

(75) Inventors: Stefan Busse, Troisdorf (DE); Uwe Lullwitz, Cologne (DE); Eberhard Seipel, Bonn (DE)

(73) Assignee: Kautex Maschinenbau GmbH, Bonn (DE)

( * ) Notice: Subject to any disclaimer, the term of this patent is extended or adjusted under 35 U.S.C. 154(b) by 748 days.

(21) Appl. No.: 11/857,557

(22) Filed: Sep. 19, 2007

(65) Prior Publication Data
US 2008/0069915 A1    Mar. 20, 2008

(30) Foreign Application Priority Data
Sep. 19, 2006   (DE) .................. 10 2006 044 589

(51) Int. Cl.
*B29C 49/78* (2006.01)
(52) U.S. Cl. ........... 425/163; 425/162; 700/17; 700/204
(58) Field of Classification Search .................. 425/162, 425/163; 700/17, 204
See application file for complete search history.

(56) References Cited

U.S. PATENT DOCUMENTS

| 5,470,218 | A   | * | 11/1995 | Hillman et al. ................ 425/144 |
| 6,311,101 | B1  | * | 10/2001 | Kastner ......................... 700/197 |
| 6,338,004 | B1  | * | 1/2002  | Usui ............................. 700/200 |
| 6,618,041 | B2  | * | 9/2003  | Nishizawa ..................... 345/173 |
| 6,682,670 | B2  | * | 1/2004  | Lullwitz et al. .............. 264/40.3 |
| 6,684,264 | B1  | * | 1/2004  | Choi .............................. 710/15 |
| 6,915,182 | B2  |   | 7/2005  | Usui et al. |
| 7,015,932 | B1  |   | 3/2006  | Koike et al. |
| 7,082,340 | B2  | * | 7/2006  | Fehrer et al. ..................... 700/83 |
| 7,092,771 | B2  | * | 8/2006  | Retlich et al. .................... 700/72 |
| 7,346,425 | B2  |   | 3/2008  | Nishizawa et al. |
| 2006/0157880 | A1 |   | 7/2006  | Hehl |
| 2007/0156279 | A1 |   | 7/2007  | Dalley |

FOREIGN PATENT DOCUMENTS

| CA | 2050957 | 12/1992 |
| DE | 19546831 | 6/1996 |
| DE | 10012508 | 9/2001 |
| DE | 10060747 | 1/2003 |

(Continued)

OTHER PUBLICATIONS

EPO Search Report dated Jan. 15, 2008 received in corresponding EPO Patent Application No. EP 07 01 7705, 8 pgs.
"Generationensprung, Die Maschinensteuerung CC 200", Plastverarbeiter, Huethig GmbH, Oct. 2003.

(Continued)

*Primary Examiner* — Robert B Davis
(74) *Attorney, Agent, or Firm* — Grossman Tucker Perreault & Pfleger, PLLC

(57) ABSTRACT

The invention relates to a controller for a machine with a number of functional units, wherein the controller comprises at least one input and output device for setting or displaying the movement sequences and/or state variables of the functional units of the machine and operator control elements for selecting specific input and display functions. The input and display functions are arranged in groups on various levels, all the functional units of the process are depicted by means of associated operator control elements on a first, upper input and display level. All the input and display functions associated with a functional unit are respectively depicted on in each case one or more further levels, which can respectively be activated directly by actuation of the corresponding operator control element of the first level.

7 Claims, 4 Drawing Sheets

FOREIGN PATENT DOCUMENTS

Figure 1:
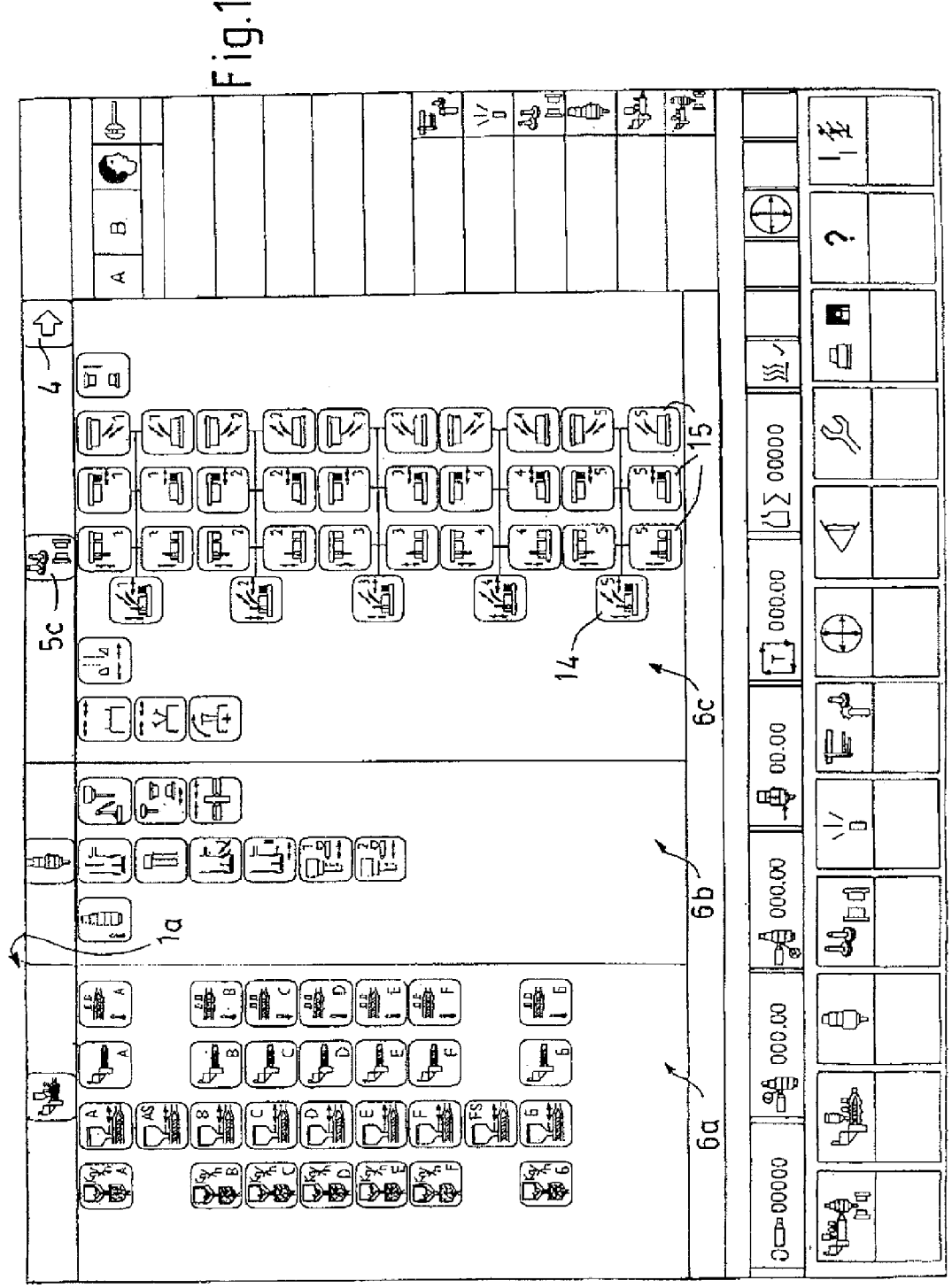

| | | |
|---|---|---|
| GB | 2302419 A | 1/1997 |
| JP | 2103114 | 4/1990 |
| WO | 2005009719 | 2/2005 |
| WO | 2007045073 | 4/2007 |

OTHER PUBLICATIONS

Huber, Anton, "Welche Moglichkeiten Bietet Die Transputertechnik?", Plastverarbeiter, Huethig GmbH, Nov. 1991.

* cited by examiner

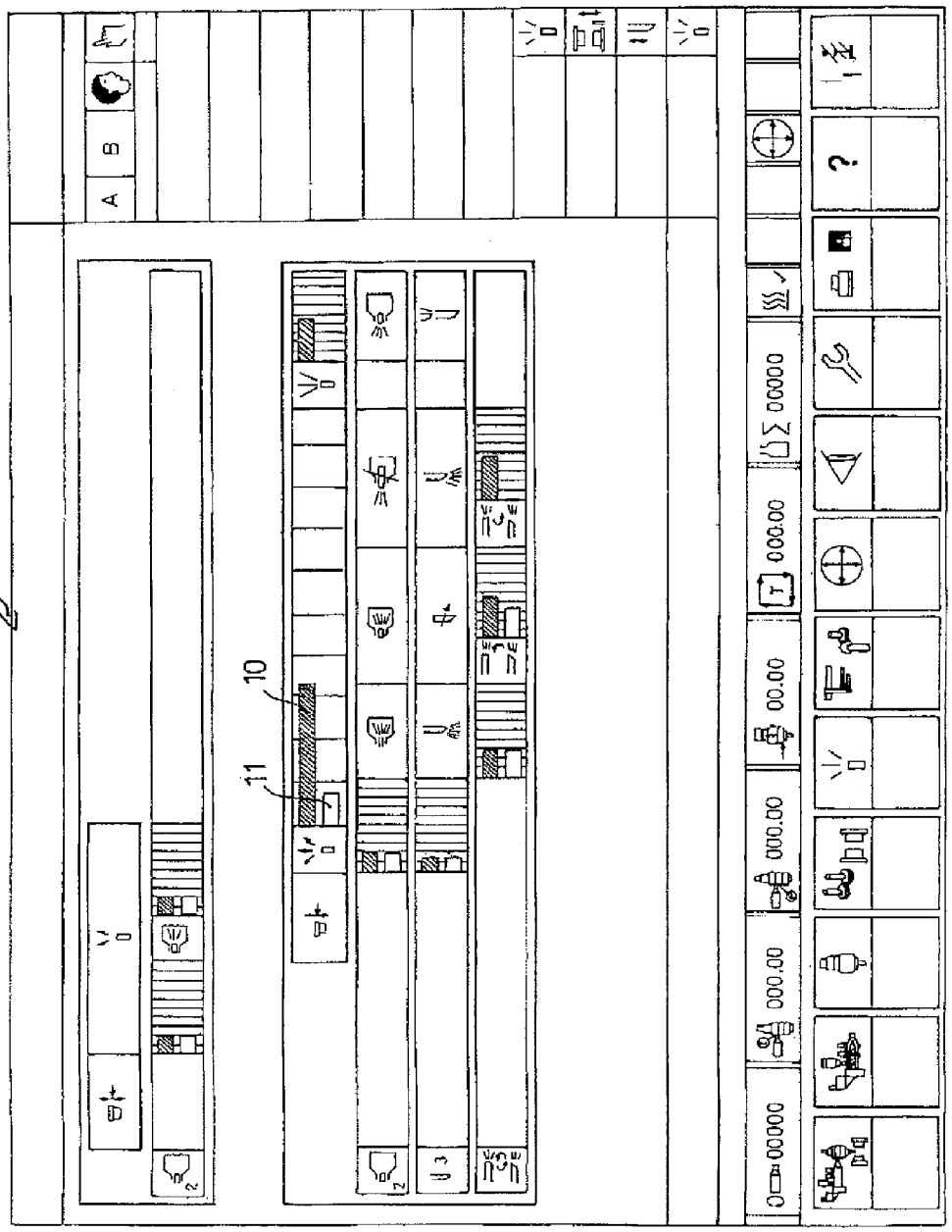

CONTROLLER FOR A MACHINE WITH A NUMBER OF FUNCTIONS UNITS, IN PARTICULAR CONTROLLER FOR A BLOW-MOLDING MACHINE

The invention relates to a controller for a machine with a number of functional units, in particular a controller for a blow-molding machine. Machines that have a number of interacting functional units, such as blow-molding machines for example, are often parameterized or programmed by means of programmable controllers. The parameterization and programming is performed by means of input and output devices, such as for example control consoles with a display device, or by screens that can be controlled by touch input (sensor screens), by means of which various machine functions can be selected or set. Various states of functional units of the machine are displayed numerically or alphanumerically. In addition, known controllers offer the possibility of parameterizing various functional units and also starting up or executing specific functional cycles of a machine.

The input and display functions of the controller are usually assigned to specific hydraulic, pneumatic or electrical functions.

The input and parameterization of specific functions of the controller is usually hierarchically structured. The menu structure is usually built up in a way corresponding to the hydraulic, pneumatic or electrical switching or mechanical operating mode of the individual functional devices or functional groups.

This has the consequence that not only the parameterization but also the enquiry of specific states, or else the execution of specific movement cycles, of the machine to be controlled is relatively complex. Often, the user has to follow a tree-like branched menu structure to set specific parameters for valves, servomotors or other parts, which in terms of operator control is scarcely intuitive or not very user-friendly.

The visualization of specific movement cycles and specific movement sequences in the case of complex machine control systems is also only possible in the case of the known programmable controllers in the form of complex numeric and alphanumeric displays, as a result of which both the control and the parameterization of the machine become quite time-consuming. For example in the case of a blow-molding machine with an extrusion device, blow mold parts that are movable in relation to one another and possibly with respect to the extrusion device, and means for removing articles from the blow mold, for example grippers or the like, a display of the states of movement, for example of the blow mold halves, the acceleration phases and deceleration phases of the mold halves in the closing or opening movement, is only performed alphanumerically, which does not provide a clear overview.

The invention is therefore based on the object of providing a controller for a machine with a number of complex functional units, such as for example for a blow-molding machine, in which particularly simple setting and/or display of the movement sequences and/or state variables of the functional units of the machine is possible. In particular, the visualization of the movement sequences and state variables is also intended to be such that these variables can be quickly, easily and intuitively registered.

The object is achieved by a controller for a machine with a number of functional units, in particular by a controller for a blow-molding machine, wherein the blow-molding machine comprises at least one extrusion device, blow mold parts that are movable in relation to one another and possibly with respect to the extrusion device, means for molding at least one article in the blow mold and means for removing the article from the blow mold and wherein the controller comprises at least one input and output device for setting and/or displaying the movement sequences and/or state variables of the functional units of the machine and operator control elements for selecting specific input and display functions, wherein the input and display functions are arranged at least partially in groups on various levels, the functional units, preferably all of them, of the process are depicted by means of associated operator control elements on a first, upper input and display level and the input and display functions associated with a functional unit, preferably all of them, are respectively depicted on in each case at least one further level, which can respectively be activated directly by actuation of the corresponding operator control element of the first level.

The benefits of the method according to the invention can be summarized by saying that all the functional units of the machine can be directly activated by means of the first and uppermost input and display level, to be precise without regard to their electrical, pneumatic or hydraulic interconnection. In the case of the controller of a blow-molding machine, on the upper input and display level, for example, all the functional units and functions of the blow-molding process, beginning with the material preparation and plastication in the extruder, through the forming, storage and manipulation of the extrudate, the shaping in the blow mold and additional functions up to and including the devices for removing the finished blow-molded article, are arranged in groups and displayed by corresponding symbols.

The symbols at the same time represent operator control elements of the input and output device, preferably formed as a sensor screen (a screen that can be controlled by touch input).

Expediently, each functional unit of the machine, for example the molds, is depicted by groups of individual functions that are grouped together on the first input and display level, specific functions preferably allowing themselves to be freely assigned to specific functional units.

Each function of the process can be depicted as a graphic symbol, at least some of the functional symbols being formed as a touch sensitive operator control element.

At least some of the functional units may be capable of being parameterized by means of corresponding operator control elements of the further level.

Preferably, the state variables of at least some functional units are capable of being visualized in the form of graphic displays.

The display of at least some state variables may, for example, be reproducible two-dimensionally as a function of a cycle time, so that the user can immediately register the state and the movement sequence of specific machine parts without numeric or alphanumeric information.

Figure 2:
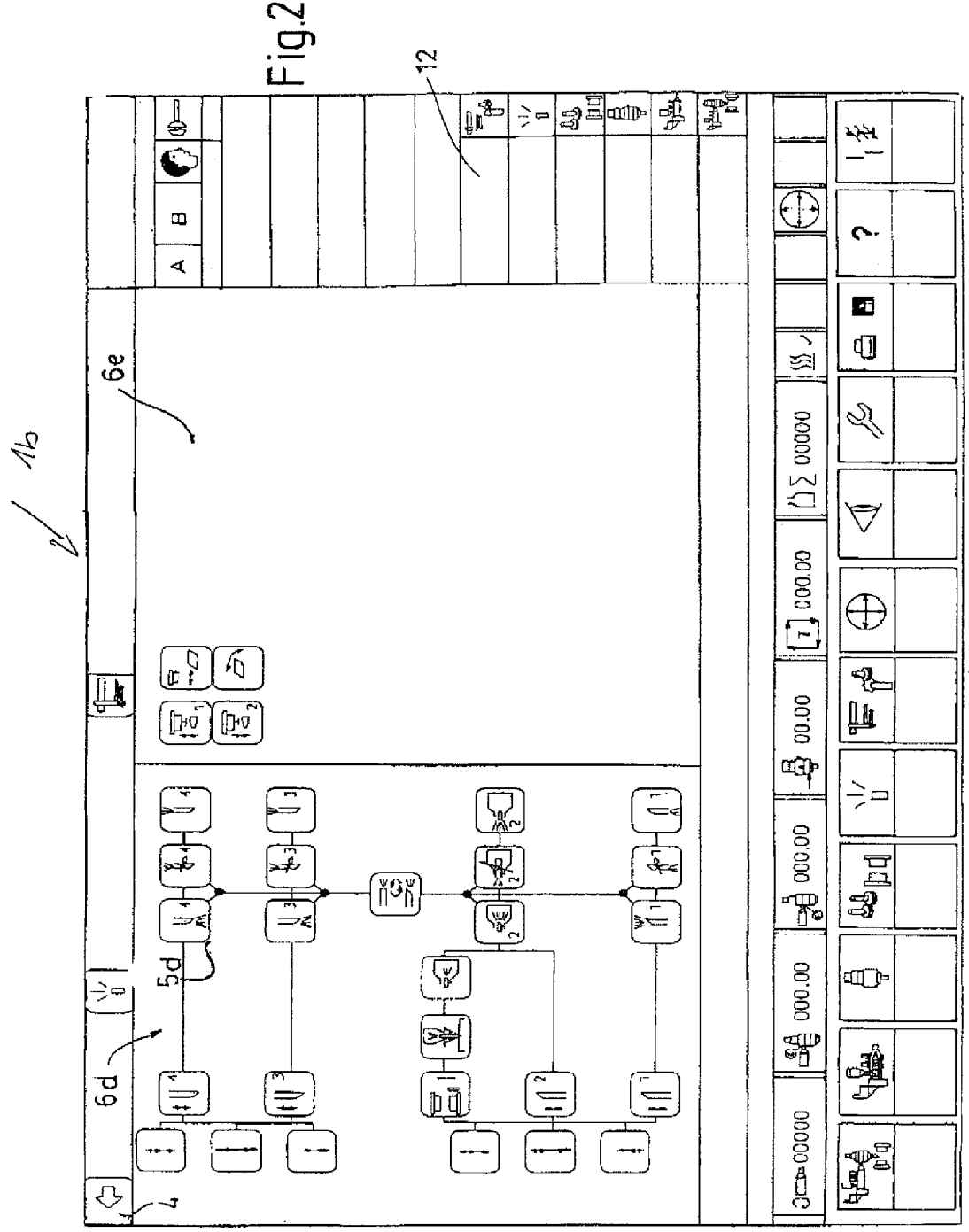
Figure 3:
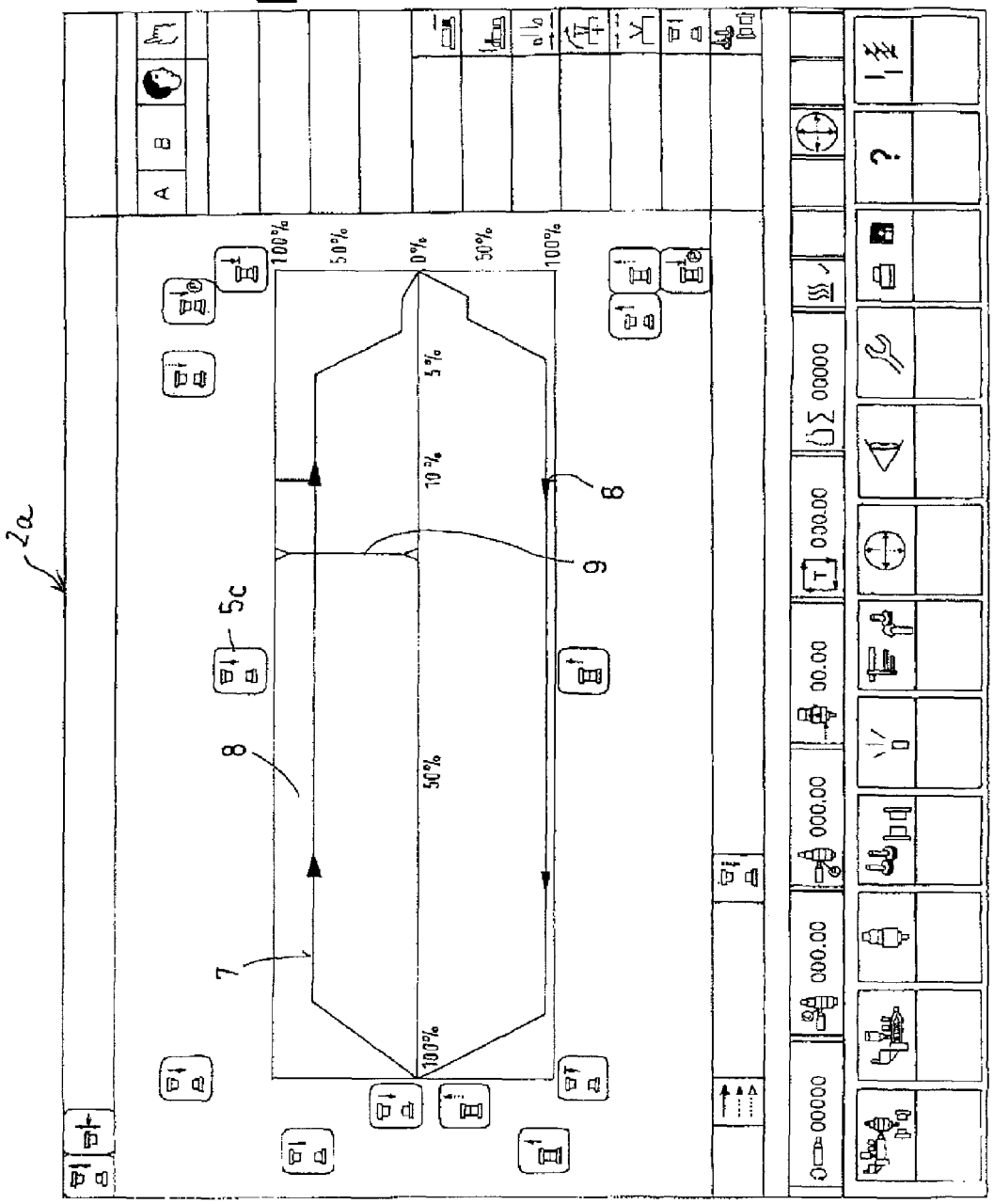

The invention is explained below on the basis of an exemplary embodiment illustrated by the drawings, in which:

FIG. 1 shows a first part of the first, upper input and display level of the input and output device as part of the controller of a blow-molding machine, FIG. 2 shows a second part of the upper input and display level of the input and output device, FIG. 3 shows a second input and display level, below the upper input and display level, of the is input and output device, which clearly indicates the state and movement sequence of the blow mold halves, and FIG. 4 shows another page of the second input and display level, below the upper input and display level, of the input and output device of the controller of the blow-molding machine, on which the functions of the blow-molding operation are depicted.

In the case of the exemplary embodiment described, the figures show different pages of two input and display levels 1a, 1b; 2a and 2b of an input and output device of a controller for a blow-molding machine. The input and output device is formed as a sensor screen (a screen that can be controlled by touch input) and represents part of a programmable controller. FIGS. 1 and 2 reproduce the upper input and display level 1a, 1b, which for purely practical considerations (size of representation) is shown in the case of the present exemplary embodiment on two pages of the menu arranged alongside one another. The arrow keys 4 make it possible to scroll back and forth between the first part of the upper input and display level 1a and the second part of the upper input and display level 1b. The symbols 5 in the form of boxes, respectively arranged in groups on the respective input and display levels 1a, 1b; 2a, 2b, in each case represent operator control elements or keys of the input and output device. The upper input and display level comprises altogether five relatively large control panels 6a-e, on which individual functional units and functions of the blow-molding process are respectively displayed in groups in the form of symbols 5, the functional units and functions associated with a process step being respectively grouped in a control panel 6a-d. For example, all the functions concerning the material preparation and plastication are grouped together in the control panel 6a, each of the symbols 5 at the same time representing an operator control element which, when touched or selected, opens an associated input and display level 2a, 2b, or in each case opens an input level or a display level.

In the control panel 6b, for example, all the functions of the parison forming, storage and manipulation are grouped together, in the control panel 6c there are for example the various functions concerning the mold movements and functions of additional devices, such as for example a spreading device for the extrudate emerging at the extrusion die head. In the control panel 6d, all the functions concerning the blow-molding operation, including pre-blowing and purging, are grouped together. In the contour panel 6e, for example, the functions concerning article removal and finishing are grouped together.

In the exemplary embodiment discussed here, only details from the operator menus of the controller according to the invention are represented by way of example. The respectively represented input and display levels show only individual states of a configuration of a blow-molding machine given as an example; it is clear to a person skilled in the art that the individual symbols and control panels 5, 6 can be individually reserved and assigned to particular machine functions. Usually, a controller has various input modes, for example a setting-up mode, a parameterizing mode or else just a monitoring mode.

Shown here are only those menu pages of the two input and display levels that are helpful in understanding the way in which the controller functions. It is likewise evident to a person skilled in the art that the symbols 5 may also vary according to the machine to be controlled. Designated by the reference numeral 12 are labeling fields of the input and display levels 1a, 1b; 2a, 2b represented in the figures, which are kept free for entering text to describe specific symbols.

On the upper input and display level 1a, 1b, the operator control elements (symbols 5) are respectively arranged from left to right in the functional sequence of the blow-molding machine.

As is known, the blow-molding process begins by plasticating thermoplastic material in an extruder. The material is transported to the extrusion die head (control panel 6b) by means of the extruder. The tubular preform discharged or emerging from the extrusion die head is spread out in the exemplary embodiment described by stretching mandrels between the open halves of a blow mold. It is self-evident to a person skilled in the art that the extrusion of the preform can be performed both continuously and discontinuously. Subsequently, the mold halves of the mold are closed, the preform is made to expand within the mold cavity, to be precise by introducing a blowing pin and subjecting it to gas pressure. After that, the blow mold is moved under the extrusion die head, the article is removed and is finished.

The symbols 5 respectively represented on the upper input and display level in each case embody individual functional units and associated functions of the blow-molding machine. The symbol provided with the reference numeral 14 in control panel 6c of the upper input and display level 1a embodies the functional unit of a valve for controlling slides in the mold. The symbols designated by 15, on the other hand, represent various functions of the valve. The upper input and display level 1a, 1b, represented in FIGS. 1 to 2, is in the setting-up mode, in which a functional unit can be assigned various functions. In a parameterizing mode or monitoring mode, only those functions that are linked with a functional unit are then displayed.

In each case, all the input and display functions belonging to a functional unit and function of the process performed by the machine are respectively grouped together on an input and display level 2a, 2b arranged below the upper input and display level 1a, 1b. In the case of the exemplary embodiment represented, as mentioned, altogether two input and display levels are provided, arranged one above the other, namely the upper input and display level 1a, 1b and the lower input and display level 2a, 2b, each input and display level 1a, 1b; 2a, 2b respectively comprising a number of menu pages arranged alongside one another. These menu pages arranged alongside one another may in each case have only input functions or only display functions. Similarly, it is provided that all the input and display functions belonging to a specific functional unit of the process are grouped together on one menu page.

As an alternative to this, it is possible to arrange a number of input and display functions hierarchically underneath the uppermost input and display function, direct access to the respective input and display function also being possible in this case from the uppermost input and display level 1a, 1b.

In the case of a machine control system, fundamentally different elements, for example hydraulic valves, pneumatic valves and switches, can perform different functions. It is important for the controller according to the invention that the input and display functions that belong to a machine function or to a functional unit are respectively displayed in a functional relationship on a page.

In FIG. 1, the symbol 5c in control panel 6c, for example, embodies the function "closing the blow mold halves", which belongs to the functional unit "blow mold". An actuation of this operator control element opens the second input and display level 2a, which is represented in FIG. 3 and depicts all the input and display functions relating to the functional unit "blow mold halves". The graph 7 represented in FIG. 3 illustrates the movement sequence of the closing and opening of the blow mold halves, the displacement of the blow mold halves being plotted against time. In the upper half of the graph 7, the closing operation is depicted, in the lower half of the graph the opening operation is depicted. The arrows 8 indicate the movement sequence. The displacement is plotted on the x axis, the speed of the blow mold halves is plotted on the y axis, in each case as relative variables. The last 10% of the closing displacement of the blow mold halves is shown in an exaggerated form. The position of the blow mold halves in relation to one another at any given instant is visualized by means of the progress bar designated by 9.

For example, the selection of the symbol 5d in control panel 6d for example leads to the building up of the features shown in FIG. 4 of the second input and display level 2b, on which all the functions and states of the blow-molding operation are represented. On the display concerned, the sequence and time duration of specific blow-molding operations are also represented as a desired/actual comparison. The respectively shaded progress bars 10 indicate the desired duration of the operation concerned, the non-shaded progress bars 11 indicate the actual duration of the respective operation. Fields that only show progress bars symbolize waiting times. Fields that show progress bars and corresponding symbols illustrate the time duration of a specific operation or a specific function as a set/actual comparison. The sequence of the operations is represented from top to bottom and from left to right.

The selection of specific functional units on the uppermost input and display level 1a, 1b in each case allows the opening of an input and display level on which the corresponding display functions of a functional unit are grouped together. The selection of a specific individual function in one of the control panels 6a-e opens an input and/or display level on which the respective function is capable of being parameterized.

LIST OF REFERENCE NUMERALS

1a, 1b first and second menu pages of upper input and display level
2a a menu page of the second input and display level
2b a menu page of the second input and display level
4 arrow keys
5, 5c, 5d symbols
6a-e control panels
7 graph
8 arrows
9, 10, 11 progress bars
12 labeling fields
14 functional units
15 functions

The invention claimed is:
1. Controller for a blow-molding machine with a number of functional units, wherein the blow-molding machine comprises:
at least one extrusion device,
blow-mold machine parts that are movable in relation to one another and with respect to the extrusion device,
means for molding at least one article in the blow mold and means for removing the article from the blow mold,
wherein the controller comprises at least one input and output device for setting and/or displaying the movement sequences and/or state variables of the functional units of the blow-molding machine and operator control elements for selecting specific input and display functions,
wherein the input and display functions are arranged at least partially in groups on various levels, all of the functional units of the process are depicted by means of associated operator control elements on a first, upper input and display level, and
all of the input and display functions associated with a functional unit are respectively depicted on in each case one or more further levels, each of which are directly activated by actuation of the corresponding operator control element of the first level.
2. Controller according to claim 1, wherein the input and output device is formed as a sensor screen.
3. Controller according to claim 1 wherein each functional unit is depicted by groups of functions that are grouped together on the first input and display level.
4. Controller according to claim 3, wherein each function of the process is depicted as a graphic symbol and in that at least some of the functional symbols are formed as a touch-sensitive operator control element.
5. Controller according to claim 1, wherein at least some of the functional units are capable of being parameterized by means of corresponding operator control elements of the further levels.
6. Controller according to claim 1, wherein the state variables of at least some functional units are capable of being visualized in the form of graphic displays.
7. Controller according to claim 6, wherein the display of at least some state variables is reproducible two-dimensionally as a function of a cycle time.

\* \* \* \* \*

UNITED STATES PATENT AND TRADEMARK OFFICE
CERTIFICATE OF CORRECTION

| | | |
|---|---|---|
| PATENT NO. | : 7,918,661 B2 | Page 1 of 1 |
| APPLICATION NO. | : 11/857557 | |
| DATED | : April 5, 2011 | |
| INVENTOR(S) | : Busse et al. | |

It is certified that error appears in the above-identified patent and that said Letters Patent is hereby corrected as shown below:

On Title page, Item 54, in column 1, line 2, in the Title, delete "FUNCTIONS" and insert -- FUNCTIONAL --, therefor.

In the Specification, column 1, line 2, in the Title, delete "FUNCTIONS" and insert -- FUNCTIONAL --, therefor.

Signed and Sealed this
Twenty-first Day of June, 2011

David J. Kappos
*Director of the United States Patent and Trademark Office*